US009007391B2

(12) United States Patent
Ritts

(10) Patent No.: US 9,007,391 B2
(45) Date of Patent: Apr. 14, 2015

(54) IMAGE COLOR CORRECTION FOR AN IMAGE BY A GRAPHICAL PROCESSING UNIT LOOKING UP COLOR CORRECTIONS IN A LOOKUP TABLE

(71) Applicant: Motorola Mobility LLC, Libertyville, IL (US)

(72) Inventor: James Paul Ritts, Atherton, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 202 days.

(21) Appl. No.: 13/646,769

(22) Filed: Oct. 8, 2012

(65) Prior Publication Data

US 2014/0098120 A1   Apr. 10, 2014

(51) Int. Cl.

| G06T 15/00 | (2011.01) |
|---|---|
| G09G 5/00 | (2006.01) |
| G09G 5/02 | (2006.01) |
| G06T 1/00 | (2006.01) |
| G09G 5/36 | (2006.01) |
| G03F 3/08 | (2006.01) |
| G06K 9/00 | (2006.01) |

(Continued)

(52) U.S. Cl.
CPC .............. *H04N 9/735* (2013.01); *G09G 5/026* (2013.01); *G09G 5/06* (2013.01); *G09G 5/363* (2013.01); *G09G 2340/06* (2013.01)

(58) Field of Classification Search
USPC ................. 345/418–419, 581, 589, 587, 590, 345/600–601, 660, 679, 501, 545, 549, 345/690; 358/518–519, 523; 382/154, 162, 382/166–167, 232, 254, 260, 274, 275, 285, 382/293, 298, 305, 307

See application file for complete search history.

(56) References Cited

U.S. PATENT DOCUMENTS

| 2008/0101467 A1 * | 5/2008 | MacMullan et al. ..... 375/240.12 |
| 2010/0188415 A1 * | 7/2010 | Pettigrew et al. .............. 345/589 |

(Continued)

OTHER PUBLICATIONS

Gregg Tavares, "WebGL Techniques and Performance", Google, May 10-11, 2011, 7 pages, Mountain View, California, USA.

(Continued)

*Primary Examiner* — Wesner Sajous
(74) *Attorney, Agent, or Firm* — Wolfe-SBMC

(57) ABSTRACT

A method for providing a LUT for changing color components of pixels of an image includes generating N two-dimensional slices from a three-dimensional LUT. The N two-dimensional slices are arranged in order from a first two-dimensional slice to an $N^{th}$ two-dimensional slice. The method includes generating N upsampled slices corresponding to the N two-dimensional slices. The N upsampled slices are arranged in order from a first upsampled slice to an $N^{th}$ upsampled slice. The method includes forming a first group of slices comprising the N upsampled slices, and forming a second group of slices comprising a second two-dimensional slice of the N two-dimensional slices through the $N^{th}$ two-dimensional slice and a copy of the $N^{th}$ two-dimensional slice. The method includes storing the first group of slices and the second group of slices, respectively, in a zero level of a mip map and a first level of the mip map.

20 Claims, 6 Drawing Sheets

(51) Int. Cl.
*G06K 9/40* (2006.01)
*G06K 9/36* (2006.01)
*G06K 9/32* (2006.01)
*G09G 5/06* (2006.01)
*H04N 9/73* (2006.01)

(56) References Cited

U.S. PATENT DOCUMENTS

2011/0316851 A1* 12/2011 Pettigrew et al. ............. 345/419
2012/0070082 A1* 3/2012 Tin ................................ 382/167
2012/0309302 A1 12/2012 Buhot
2013/0322753 A1* 12/2013 Lim et al. ...................... 382/167

OTHER PUBLICATIONS

Google, "Sessions, WebGL Techniques and Performance", Sep. 13, 2012, 2 pages, http://www.google.com/events/io/2011/sessions/webgl-techniques-and-performance.html.

* cited by examiner

IMAGE COLOR CORRECTION FOR AN IMAGE BY A GRAPHICAL PROCESSING UNIT LOOKING UP COLOR CORRECTIONS IN A LOOKUP TABLE

BACKGROUND

A characteristic color is color that is not included in a scene and is an artifact generated by an imaging device. Cameras often impart characteristic colors onto the images they produce. For example, a video camera may impart blue tones in the captured video images. Displays that display images may likewise impart characteristic colors onto the displayed images. Further, film (e.g., 35 mm film) often imparts a characteristic color onto images on the film. If characteristic colors are not removed from images before the images are displayed, the colors in the images may be unacceptable to viewers. For example, the blue tones that a video camera may impart onto video images can result in unnatural colors if not corrected.

Characteristic colors imparted onto images are often corrected by computing devices before the images are displayed, stored, recorded on film, etc. A graphical processing unit (GPU) included in the computing device may perform the correction.

A GPU may include a three-dimensional lookup table (3D LUT) that is used to provide color correction on images. A 3D LUT stores "color components" for colors in an image; e.g., a pixel in the image may be characterized by a red color component, a green color component, and a blue color component. Each dimension of the 3D LUT corresponds to a color component (e.g., red, green, blue). Color components may be represented by "color coordinates", which are numeric values of the color components. For example, the red color component of a pixel in an image may have a value (i.e., coordinate) of 55, the green color component of the pixel may have a value of 135, and the blue color component may have a value of 39.

The 3D LUT may be used to provide a mapping of the input colors in an input image to output colors of an output image. In particular, the (input) color coordinates of the (input) color component of each pixel in the input image are used to index respective dimensions of the 3D LUT to access corresponding (output) color coordinates of the (output) color component of a corresponding pixel in the output image. If the 3D LUT is properly configured, then a characteristic color that is imparted in the input image can be eliminated from the resulting output image.

Different imaging devices, such as cameras, video displays, and so on, exhibit different color characteristics. Imaging devices that capture images may impart their specific color characteristics on the captured images, so that the colors of the imaged subject are not accurately captured. Imaging devices that display images may impart their specific color characteristics on the displayed image, so that the colors in the image being displayed are not accurately presented. The color characteristics imparted by a given imaging device can be characterized and well understood. Accordingly, a 3D LUT can be configured specifically for the given imaging device to provide a mapping that removes the color characteristic from an input image, whether the input image is a captured image or a displayed image.

In addition to removing characteristic colors from images, a GPU using a 3D LUT may add color effects to images. For example, specific 3D LUTs are designed so that a given color (e.g., red) in an image can be switched with another color (e.g., yellow), or so that colors in the image can be inverted to provide a negative of the image, etc.

GPUs for desktop computers, laptop computers, etc. are typically capable of storing 3D LUTs and performing color correction using the 3D LUTs. GPUs for mobile devices, on the other hand, are often not capable of storing 3D LUTs and are often not specifically designed for performing color correction. Consequently, color rendering of images in video games, videos, and the like performed on mobile devices may not produce acceptable colors.

DETAILED DESCRIPTION

Figure 1:
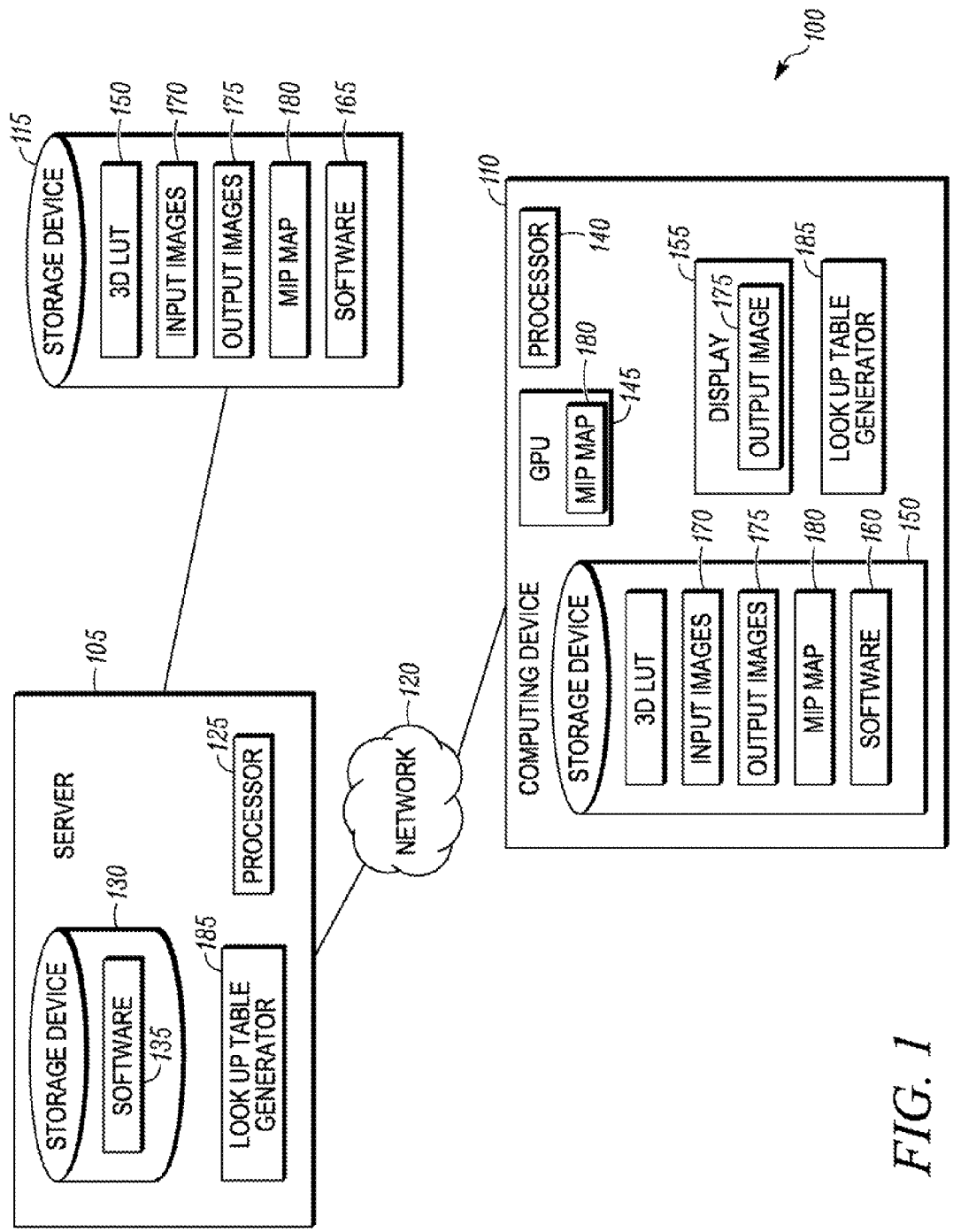
FIG. 1 depicts a computing system according to one embodiment.

Described herein are techniques for generating a lookup table (LUT) for use by a graphics processing unit for performing color correction to pixels of an image.

According to one embodiment, a method for providing a lookup table (LUT) for changing color components of pixels of an image includes generating N two-dimensional slices from a three-dimensional LUT. The N two-dimensional slices are arranged in order from a first two-dimensional slice to an $N^{th}$ two-dimensional slice. The method includes generating N upsampled slices corresponding to the N two-dimensional slices. The N upsampled slices are arranged in order from a first upsampled slice to an $N^{th}$ upsampled slice. The method includes forming a first group of slices that includes the N upsampled slices, and forming a second group of slices that includes a second two-dimensional slice of the N two-dimensional slices through the $N^{th}$ two-dimensional slice and a copy of the $N^{th}$ two-dimensional slice. The method includes storing the first group of slices and the second group of slices, respectively, in a zero level of a mip map and a first level of the mip map.

According to another embodiment, a method for changing color components of pixels of an image includes receiving input color coordinates for input color components of the pixels, wherein the input color coordinates are for a first color component, a second color component, and a third color component, and performing color coordinate lookups for the input color coordinates in a lookup table that is included in a GPU. The lookup table includes a first group of slices, which includes upsampled slices arranged in order from a first upsampled slice to an $N^{th}$ upsampled slice. The N upsampled slices correspond to N two-dimensional slices generated from a three-dimensional LUT. The N two-dimensional slices are arranged in order from a first two-dimensional slice to an $N^{th}$ two-dimensional slice. A second group of slices includes a second two-dimensional slice of the N two-dimensional slices through the $N^{th}$ two-dimensional slice, and a copy of the $N^{th}$ two-dimensional slice. The method further includes outputting, from the GPU changed color components for the pixels based on the input color coordinate lookups in the lookup table.

According to another embodiment, a non-transitory computer-readable storage medium includes instructions for providing a lookup table (LUT) for changing color components of pixels of an image. The instructions, when executed, are for controlling a computing device to be configured for: generating N two-dimensional slices from a three-dimensional LUT, wherein the N two-dimensional slices are arranged in order from a first two-dimensional slice to an $N^{th}$ two-dimensional slice; generating N upsampled slices corresponding to the N two-dimensional slices, wherein the N upsampled slices are arranged in order from a first upsampled slice to an $N^{th}$ upsampled slice; forming a first group of slices comprising the N upsampled slices; forming a second group of slices comprising a second two-dimensional slice of the N two-dimensional slices through the $N^{th}$ two-dimensional slice and a copy of the $N^{th}$ two-dimensional slice; and storing the first group of slices and the second group of slices, respectively, in a zero level of a mip map and a first level of the mip map.

According to another embodiment, a non-transitory computer-readable storage medium includes instructions for changing color components of pixels of an image. The instructions are for controlling a computing device to be configured for: receiving, via a computing device, input color coordinates for input color components of the pixels, wherein the input color coordinates are for a first color component, a second color component, and a third color component; performing, via a graphical processing unit (GPU) of the computing device, color coordinate lookups for the input color coordinates in a lookup table that is included in the GPU, wherein the lookup table includes: i) a first group of slices comprising upsampled slices arranged in order from a first upsampled slice to an $N^{th}$ upsampled slice, wherein the N upsampled slices correspond to N two-dimensional slices generated from a three-dimensional LUT, and the N two-dimensional slices are arranged in order from a first two-dimensional slice to an $N^{th}$ two-dimensional slice, and ii) a second group of slices comprising a second two-dimensional slice of the N two-dimensional slices through the $N^{th}$ two-dimensional slice, and a copy of the $N^{th}$ two-dimensional slice; and outputting, from the GPU changed color components for the pixels based on the color coordinate lookups in the lookup table.

FIG. 1 depicts a computing system 100 according to one embodiment. Computing system 100 includes a server 105, a computing device 110, a storage device 115, and a network 120. Server 105 may be a computing device configured to operate a server operating system. Server 105 includes a processor 125 and a storage device 130. Storage device 130 may store software 135, which may be supplied from storage device 130 to processor 125 for execution. Computing device 110 includes a processor 140, a graphical processing unit (GPU) 145, a storage device 150, and a display 155. Storage device 150 may store software 160, which may be supplied from storage device 150 to processor 140 and GPU 145 for execution. Storage 115 may similarly store software 165, which may be supplied from storage device 115 to one or both of server 105 and computing device 110 for execution. Storage devices 115, 130, and 150 may be non-transitory computer readable storage mediums. Computing device 110 may include a variety of devices, such as mobile devices (e.g., a personal digital assistant (PDA), a smartphone, etc.), a desktop computer, a laptop computer, a tablet computer, etc. Network 120 may include one or more communication networks, such as one or more intranets, the Internet, etc.

According to one embodiment, storage device 115 stores one or more input images 170, such as video images, that are supplied to computing device 110 for display. According to another embodiment, computing device 110 is configured to generate input images 170. For example, the input images 170 may be images for a video game while the video game is being executed on computing device 110. Input images 170 may also be stored in storage device 150. According to one embodiment, GPU 145 includes a mip map 180 that includes color correction information for changing the colors in input images 170 to generate output images 175 having colors that are different from those of input images 170. Mip map 180 may be used by GPU 145 to perform color correction on input images 170, to add color effects to input images 170, or to otherwise manipulate the colors in input images 170.

As explained above, characteristic colors may be imparted onto input images 170 by various devices and/or software that generate and/or process input images 170. According to one embodiment, GPU 145 may use mip map 180 to remove the characteristic colors imparted onto input images 170 before the input images are displayed or stored for later display. Display 155 itself may impart characteristic colors which manifest themselves in the output images 175 rather than being imparted on input images 170. Accordingly, in another embodiment, GPU 145 may use mip map 180 to compensate for the characteristic color artifacts of display 155 itself so that input images 170 can be faithfully displayed. Techniques for generating mip map 180 are described in further detail below.

According to one embodiment, GPU 145 may use mip map 180 to deliberately change the colors of input images 170 to achieve a desired effect, rather than to correct for characteristic colors imparted onto input images 170. In a video game, for example, the colors for images produced in the video game may be changed from full spectrum color to dichromatic or monochromatic color to indicate a change in a game parameter.

Figure 2:
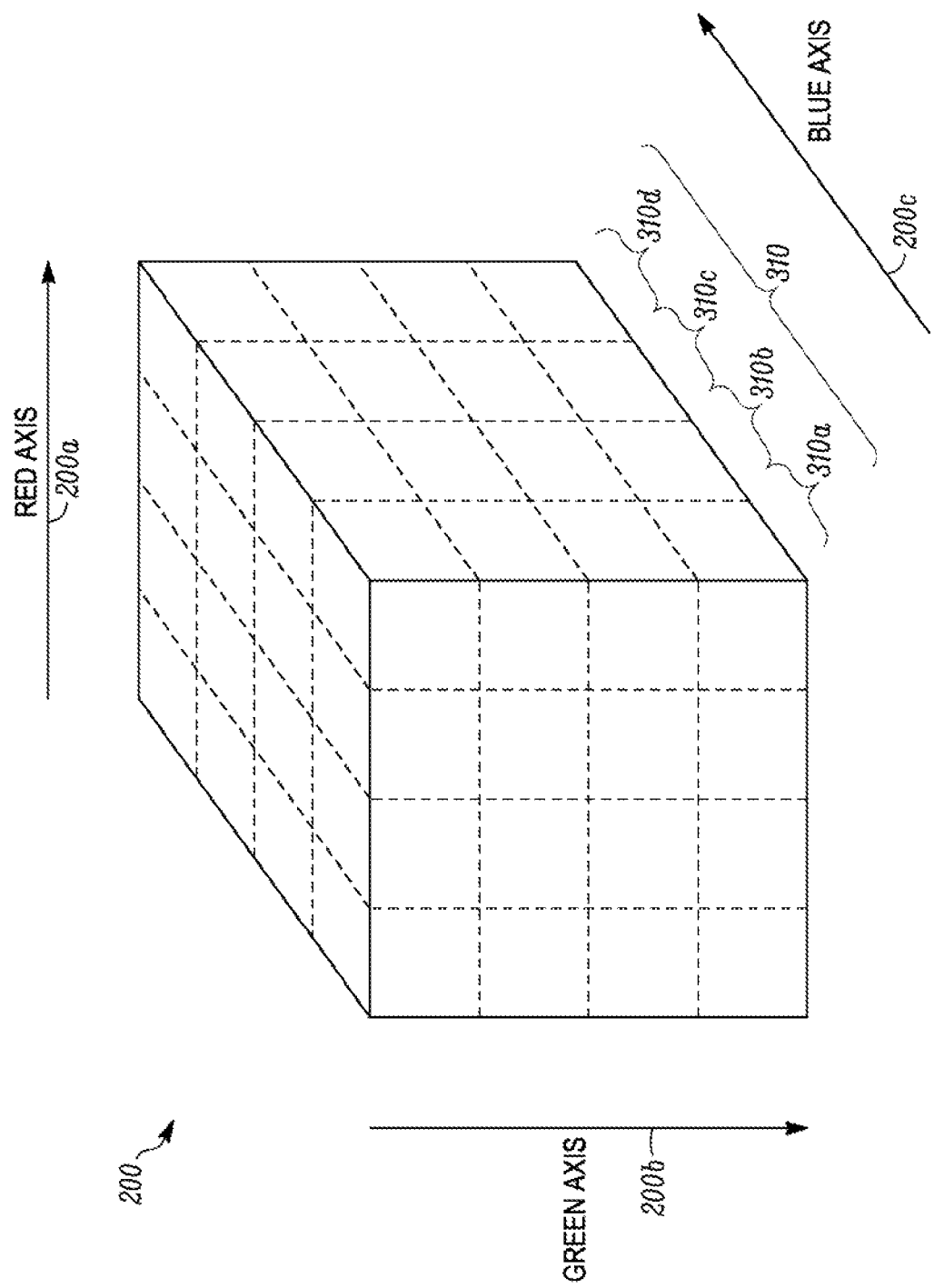
FIG. 2 depicts a three-dimensional color lookup table (3D LUT) according to one embodiment.

Referring to FIG. 2, this figure depicts an example of a three-dimensional color lookup table (3D LUT) 200. 3D LUT 200 includes color correction information used for changing the colors of input images 170. More specifically, 3D LUT 200 is a 3D lattice of output color coordinates that represent output color components. The input color coordinates for input color components of input image 170 are mapped by 3D LUT 200 to the output color coordinates for the output color components of an output image 175. This mapping may be performed on a per pixel basis or on groups of pixels. The input color coordinates (say, for a pixel of input image 170) define a point inside the lattice of 3D LUT 200. Each point is represented by a triple (3-tuple) that comprises the output color coordinates that correspond to the input color coordinates. 3D LUT 200 serves as a lookup table that a GPU may use to change the input color components of input image 170 to produce output image 175 having different output color components. Each axis of 3D LUT 200 represents one of three input color coordinates for first, second and third colors (e.g., red, green, and blue). The three axes of 3D LUT 200 are labeled 200a, 200b, and 200c, where axis 200a is the red axis, axis 200b is the green axis, and axis 200c is the blue axis. Although axes 200a, 200b, and 200c in FIG. 2 are associated with the colors red, green, and blue, respectively, it will be appreciated that the axes may be associated with other colors. In some embodiments, two axes may represent the same color. In some embodiments, one or more axes may not be assigned to any color.

3D LUT 200 is depicted in FIG. 2 as a 4×4×4 lattice, and may be characterized as having a LUT size of 4. The term "LUT size" refers to the number of color increments along each dimension of the 3D LUT. In other embodiments, the 3D LUT 200 may have different LUT sizes.

According to one embodiment, computing device 110 (or server 105) includes a lookup table generator 185 that generates mip map 180 from 3D LUT 200. Lookup table generator 185 may be a hardware module, a software module, or a combination thereof. Lookup table generator 185 forms slices 310 from 3D LUT 200 along one plane of 3D LUT 200. FIG. 2 shows four slices 310a, 310b, 310c, and 310d formed along the red-greed plane according to an example embodiment. The slices 310a, 310b, 310c, and 310d are sometimes referred to herein as the first, the second, the third, and the last slices, respectively. While slices 310 are shown in FIG. 2 as being formed along the red-green plane, the slices 310 may be formed along the red-blue plane or green-blue plane. Slices 310 have an order, from the first slice 310a to the last slice 310d based on the position of each slice among the slices 310 in 3D LUT 200. Last slice may be referred to as the $N^{th}$ slice among N ordered slices 310.

According to the example embodiment being described, lookup table generator 185 forms four slices 310a-310d from 3D LUT 200. However, lookup table generator 185 may form more slices 310 from 3D LUTs having LUT sizes greater than 4, such as a LUT size of 8 to form 8 slices from an 8×8×8 lattice, a LUT size of 16 to form 16 slices from a 16×16×16 lattice, and so on.

Figure 3:
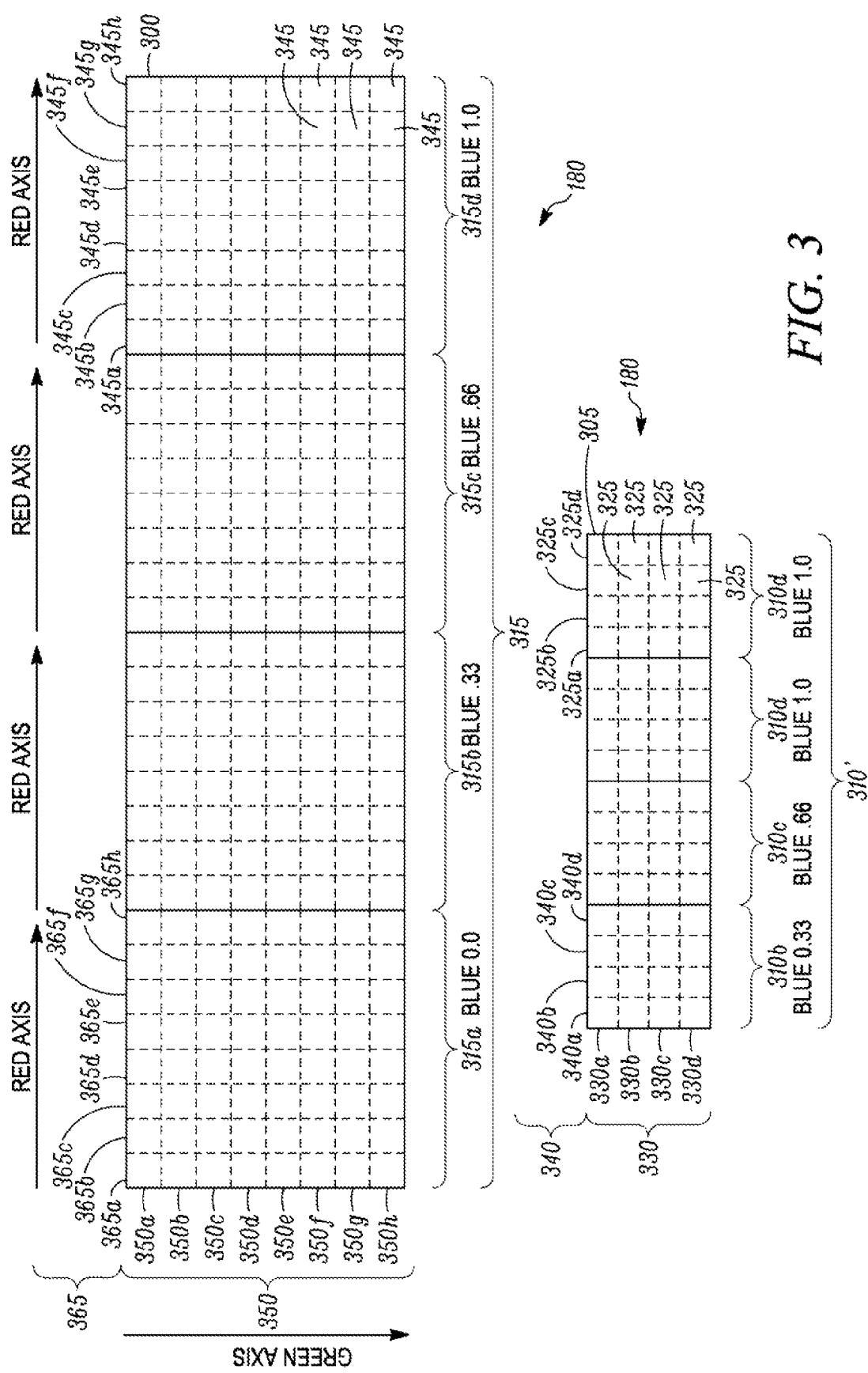
FIG. 3 depicts a mip map according to one embodiment.

FIG. 3 depicts mip map 180 according to one embodiment. Mip map 180 includes a zero level 300 and a first level 305. First level 305 is composed of slices 310' which comprise some of the slices 310 from 3D LUT 200. According to one embodiment, slices 310' in first level 305 includes second slice 310b, third slice 310c, the last slice 310d (the Nth slice), and a copy of last slice 310d. The slices 310' in first level 305 may be arranged from second slice 310b at a first end (e.g., right end) of first level 305 through last slice 310d at a second end (e.g., left end) of first level 305, where the copy of last slice 310d is repeated at the second end.

According to one embodiment, lookup table generator 185 generates upsampled slices 315 respectively from slices 310. That is, upsampled slices 315 respectively correspond to slices 310 in a one-to-one manner. Thus, for example, upsampled slice 315a is generated from slice 310a, upsampled slice 315b is generated from slice 310b, upsampled slice 315c is generated from slice 310c, and upsampled slice 315d is generated from slice 310d. Upsampled slices 310a-310d are sometimes referred to herein as the first, the second, the third, and the last upsampled slices, respectively.

Upsampled slices 315 are ordered in zero level 300 from first upsampled slice 315a through last upsampled slice 315d ($N^{th}$ slice 315d). The second upsampled slice 315b through the last upsampled slice 315d are in the same order in zero level 300 as second slice 310b through last slice 310d in first level 305.

Each slice 310a through 310d has an output color coordinate (e.g., blue output color coordinate) for the output color component (e.g., blue) represented by the axis of 3D LUT 200 (e.g., blue axis) along which slices 310a through 310d are formed. The values of the output color coordinates (e.g., blue output color coordinates) may increase from first slice 310a to last slice 310d. For example, first slice 310a may have a zero output color coordinate of 0.0 for blue, second slice 310b may have an output color coordinate of 0.33, third slice 310c may have an output color coordinate of 0.66 for blue, and last slice 310d may have an output color coordinate of 1.0 for blue. As referred to herein, output color coordinates from 0.0 to 1.0 are referred to as a "full" scale of output color coordinates, which represents a full scale of output color components for an output color.

Similarly, each upsampled slice 315a through 315d has an output color coordinate (e.g., blue output color coordinate) for the output color component (e.g., blue) represented by the axis (e.g., blue axis) along which slices 310a through 310d are formed. That is, the output color coordinate (e.g., blue output color coordinate) may increase from upsampled slice 315a to upsampled slice 315d. For example, upsampled slice 315a may have an output color coordinate of 0.0 for blue, upsampled slice 315b may have an output color coordinate of 0.33 for blue, upsampled slice 315c may have an output color coordinate of 0.66 for blue, and upsampled slice 310d may have an output color coordinate of 1.0 for blue. The relative increase in output color coordinates between slices 310 is the same as it is for slices 315.

In accordance with the present disclosure, slices 310' comprising first level 305 may be viewed as being shifted (e.g., shifted right or shifted left) by one slice relative to corresponding upsampled slices 315 in zero level 300. Thus, for example, without shifting, slices 310' of first level 305 (that correspond to upsampled slices 315, 315b, 315c, and 315d of zero level 300) would be slices 310a, 310b, 310c, and 310d. With right shifting (as illustrated in FIG. 3), slices 310' of first level 305 (that correspond to slices 315, 315b, 315c, and 315d of zero level 300) are slices 310b, 310c, 310d, and 310d (slice 310d is duplicated). The shifted position of slices 310' relative to upsampled slices 315, and the repeating of last slice 310d in first level 305 allows GPU 145 to use first level 305 and zero level 300 to perform color correction of input images 170 with a single lookup operation in first level 305 and zero level 300. A single lookup operation performed by GPU 145 can reduce the total number of processing steps performed by GPU 145 when performing color correction on input image 170.

Figure 4:
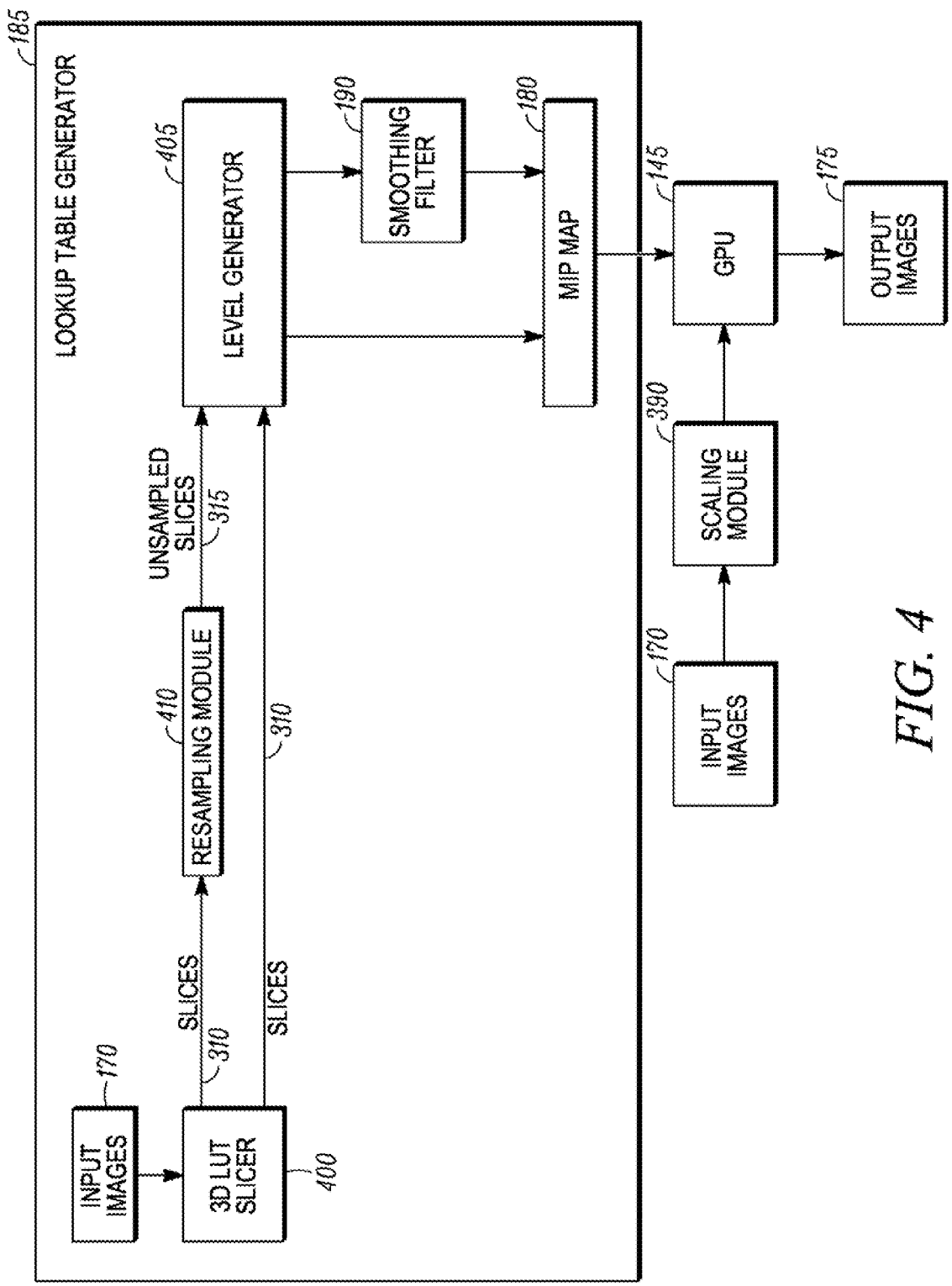
FIG. 4 depicts a lookup table generator according to one embodiment.

Referring to FIG. 4, the figure depicts lookup table generator 185 according to one embodiment. Lookup table generator 185 includes a 3D LUT slicer 400 that receives 3D LUT 200 and forms slices 310 from 3D LUT 200. 3D LUT slicer 400 transfers slices 310 to a level generator 405, which forms first level 305 from slices 310; e.g., performing shifting and duplicating to produce slices 310'. 3D LUT slicer 400 also transfers slices 310 to a resampling module 410 which upsamples slices 310 to form upsampled slices 315. Resampling module 410 transfers upsampled slices 315 to level generator 405, which forms zero level 300 from upsampled slices 315.

Referring again to FIG. 3, each slice 310' includes pixels 325 and each upsampled slice 315 includes pixels 345. Pixels 325 are arranged in rows 330 and columns 340 in each slice 310'. Each pixel 325 represents an output color coordinate for the first output color component (e.g., for red) and an output color coordinate for the second output color component (e.g., for green); blue is determined by the slice (e.g., 310b) that the pixel 325 is in. For each slice 310', output color coordinates for the first output color component increase from left to right along each row 330; for example, in the direction from pixel 325a to 325d. Output color coordinates for the first output color component are constant along columns 340. Output color coordinates for the second output color component increase along columns 340, in the direction from row 330a to row 330d, and are constant along rows 330.

Pixels 345 are arranged in rows 350 and columns 365 in each slice 310. Each pixel 345 represents an output color coordinate for the first output color component (e.g., for red) and represents an output color coordinate for the second output color component (e.g., for green). For each upsampled slice 315, the output color coordinate for the first output color component increase from left to right along each row 350; for example, in the direction from pixel 345a to 345h. Output color coordinates for the first output color component are constant along columns 365. Output color coordinates for the second output color component increase along columns 365, in the direction from row 350a to row 350d, and are constant along the rows 350.

Figure 5:
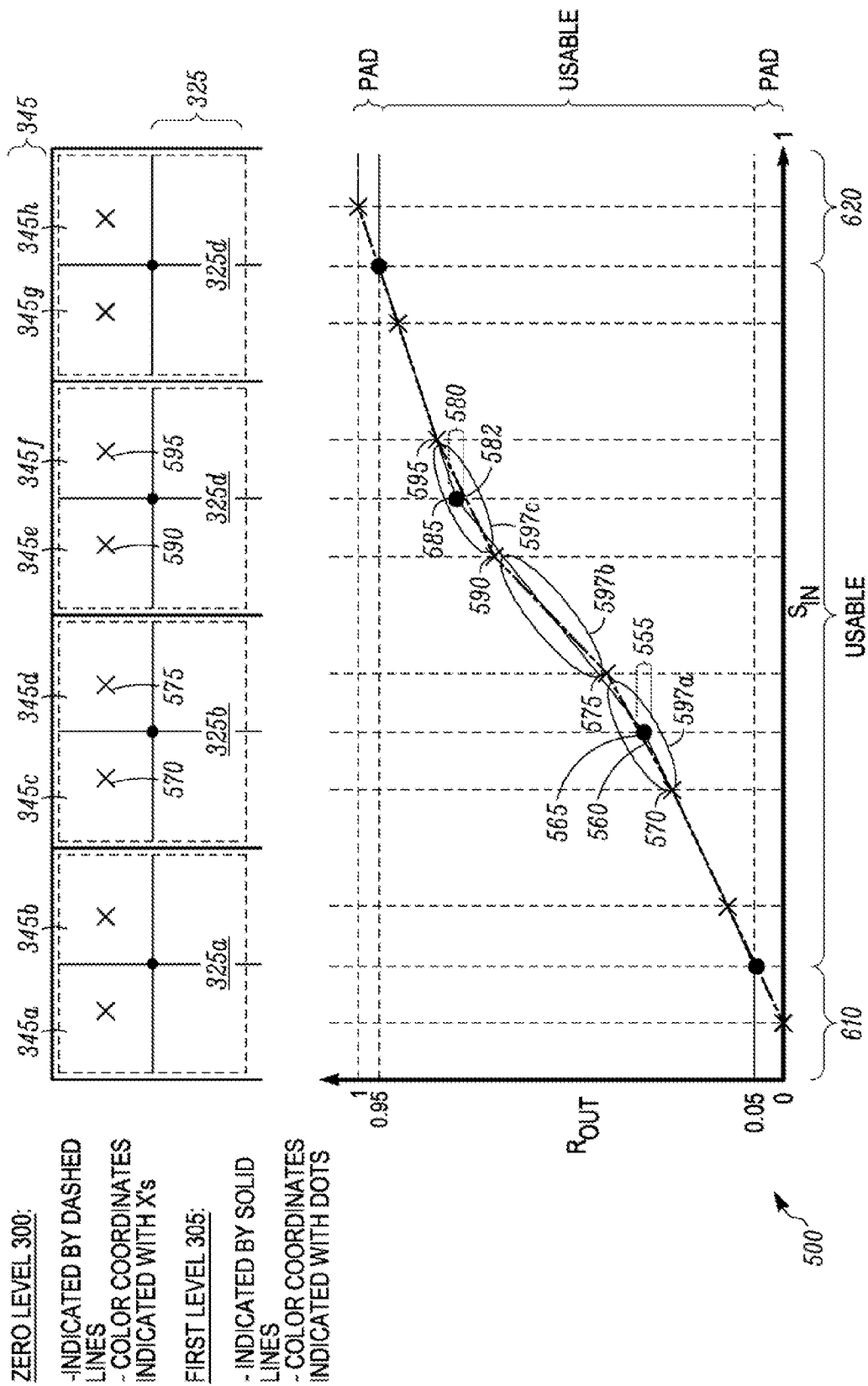
FIG. 5 illustrates color correction according to one embodiment.

According to one embodiment, level generator 405 adjusts (e.g., raises or lowers) the output color coordinates of pixels 345 so that color aliasing generated by GPU 145 during color correction or color changing of input images 170 is reduced in output images 175. Embodiments for adjusting the output color coordinates of pixels 345 are presently described with respect to FIG. 5. FIG. 5 is a high-level diagram of a method for adjusting the output color coordinates of pixels 345 to reduce color aliasing according to an embodiment.

FIG. 5 depicts four pixels 325a-325d (collectively 325) from first level 305 and eight pixels 345a-345h (collectively 345) from zero level 300. FIG. 5 also depicts a graph 550 that represents the output color coordinates from the four pixels 325 and the eight pixels 345. In the following description reference is made to the four pixels 325, the eight pixels 345, and graph 550 in combination. To facilitate the discussion, FIG. 5 shows the four pixels 325 superimposed on the eight pixels 345. The four pixels 325 are outlined in solid lines and the eight pixels 345 are outlined by dashed lines. The four pixels 325 and the eight pixels 345 are from corresponding rows of pixels in respective slices 310' and upsampled slices 315. For example, the four pixels 325 may be from the top row 330a in slice 310b, and the eight pixels 345 may be from corresponding row 350a in upsampled slice 315a (see FIG. 3).

Each of the four pixels 325 represents an output color coordinate (e.g., R, sometimes referred to as Rout for clarity) for the first output color component, and each of the eight pixels 345 includes an output color coordinate (e.g., Rout) for the first output color component. The dots in the centers of the four pixels 325 represent the output color coordinates for the four pixels 325. The x's in the centers of the eight pixels 345 represent the output color coordinates for the eight pixels 345.

Referring to graph 550, graph 550 represents a mapping between the input color coordinates (e.g., R, sometimes referred to as Rin for clarity) for the first input color component, and the output color coordinates for the first output color coordinate, where the mapping is represented by the four pixels 325 and the eight pixels 345. The input color coordinates represented by graph 550 are described below. The output color coordinates are represented by the vertical axis of graph 550.

The dots in graph 550 represent the output color coordinates from the four pixels 325. The dots (i.e., the output color coordinates) in graph 550 respectively correspond to the dots (i.e., the output color coordinates) in the four pixels 325 in a one-to-one correspondence. Specifically, each dot in graph 550 lies directly below (or is vertically aligned with) a corresponding dot in the four pixels 325. Thus, each pair of vertically aligned dots in graph 550 and the four pixels 325 represents the same output color coordinates. For example, the dot in pixel 325a and the dot in graph 550 that is directly below the dot in pixel 325a may represent the output color coordinate for Rout of 0.0. Further, the dot in pixel 325b and the dot in graph 550 that is directly below the dot in pixel 325b may represent the output color coordinate for Rout of 0.33. Further, the dot in pixel 325c and the dot in graph 550 that is directly below the dot in pixel 325c may represent the output color coordinate for Rout of 0.66. Further, the dot in pixel 325d and the dot in graph 550 that is directly below the dot in pixel 325d may represent the output color coordinate for Rout of 1.0.

The x's in graph 550 represents the output color coordinates from the eight pixels 345. The x's (i.e., the output color coordinates) in graph 550 respectively correspond to the x's (i.e., the output color coordinates) in the eight pixels 345 in a one-to-one correspondence. Specifically, each x in graph 550 lies directly below (or is vertically aligned with) a corresponding x in the eight pixels 345. Thus, each pair of vertically aligned x's in graph 550 and the eight pixels 345 represents the same output color coordinate.

The horizontal axis of graph 550 is briefly described here, and in more detail below. The horizontal axis of graph 550 represents the input color coordinate Rin for the first input color components for pixels of input image 170. The input color coordinate Rin is represented by a scaled input color coordinate Sin in FIG. 5. That is, Sin is a scaled from the input color coordinate Rin for the pixels of input image 170. Embodiments for scaling the input color coordinate Rin are described below. The scaled input color coordinate Sin is referred to in the following description which further describes the embodiments for adjusting the output color coordinates of pixels 345.

According to one embodiment, two output color coordinates of first two pixels 345a and 345b (left most pixels in each row 350) are set so that the two output color coordinates interpolate to the output color coordinate of first pixel 325a (left most pixel in each row 330) for an Sin for the center of pixel 325a. According to a further embodiment, two output color coordinates for last two pixels 345g and 345h (right most pixels of each row 350) are set so that the two output color coordinates interpolate to an output color coordinate of last pixel 325d (left most pixel in each row 330) for an Sin for the center of pixel 325d. According to one embodiment, lookup table generator 185 sets the output color coordinates of first two pixels 345a and 345b in each row 350 and last two pixels 345g and 345h is each row 350 as described above. Setting the output color coordinates of first two pixels 345a and 345b in each row 350 to interpolate to the output color coordinate of first pixel 325a in each row 330 for an Sin for the center of pixel 325a, reduces the color aliasing generated by GPU 145 for input color coordinate lookups at the first two pixels 345a and 345b in each row 350 and at first pixel 325a in each row 330. Further, setting the output color coordinates of the last two pixels 345g and 345h in each row 350 to interpolate to the output color coordinates of last pixel 325d in each row 330 for an Sin for the center of pixel 325d, reduces the color aliasing generated by GPU 145 for input color coordinate lookups at pixels 345g and 345h in each row 350 and at last pixel 325d in each row 330.

As shown in graph 550, the x's for pixels 345a and 345b are shown with a straight line that connects the x's. The straight line represents the interpolation of the output color coordinates for the x's for pixels 345a and 345b for an Sin for the center of pixel 325a. Note that the dot for pixel 325a as shown in graph 550 lies on the straight line. The dot for pixel 325a as shown in graph 550 lying on the straight line represents that the two output color coordinates of the first two pixels 345a and 345b are set to interpolate to the output color coordinates of pixel 325a for an Sin for the center of pixel 325a. If a displacement existed between the straight line and the dot in graph 550, the displacement would represent a difference between the output color coordinates from input color coordinate lookups in: i) the interpolated output color coordinate from pixels 345*a* and 345*b* and ii) the output color coordinate for pixel 325*a*. Such a displacement may result in color aliasing generated by GPU 145.

As shown in graph 550, the x's for pixels 345*g* and 345*h* are shown with a straight line that connects the x's. The straight line represents the interpolation of the output color coordinates for the x's for an Sin for the center of pixel 325*d*. Note that the dot for pixel 325*d* as shown in graph 550 lies on the straight line. The dot for pixel 325*d* lying on the straight line represents that two output color coordinates of the last two pixels 345*g* and 345*g* are set so that the two output color coordinates interpolate to the output color coordinate of last pixel 325*d* for an Sin for the center of pixel 325*d*.

The above description describes adjustments to the output color coordinates of pixels 345*a*, 345*b*, 345*g*, and 345*h* in row 350*a* for each upsampled slice 315*a*-315*d*. According to one embodiment, the adjustment described above is copied to each of the remaining rows 350*b*-350*d* for each upsampled slice 315*a*-315*d*. According to another embodiment, lookup table generator 185 applies a smoothing filter 190 (see FIG. 4) to adjust the output color coordinates of pixels 345*a*, 345*b*, 345*g*, and 345*h* as described above. Smoothing filer 190 is sometimes referred to as a smoothing function. While the above description describes adjustments to the output color coordinates for Rout for pixels 345*a*, 345*b*, 345*g*, and 345*h*, according to other embodiments, the adjustments described above are applied to the output color components for Gout (green out) for pixels 345*a*, 345*b*, 345*g*, and 345*h*.

According to a further embodiment, lookup table generator 185 applies smoothing filter 190 to the output color coordinates of pixels 345*c* through 345*f* in each row 350 of each upsampled slice 315 to adjust the output color coordinates of pixels 345*c* through 345*f*. More specifically, lookup table generator 185 applies smoothing filter 190 to the output color coordinates of pixels 345*c* through 345*f* in each row 350 to reduce differences between: i) output color coordinates from input color coordinate lookups from pixels 345*c* through 345*f* and ii) output color coordinates from input color coordinate lookups from pixels 340*b* and 340*c*. Adjusting the output color coordinates of pixels 345*c* to 345*f* may further reduce color aliasing generated by GPU 145.

The adjustment of output color coordinates of pixels 345*c* through 345*f* is presently described in further detail. Graph 550 shows an example output color coordinate difference 555 for output color coordinate 560 for Rout from zero level 300 and output color coordinate 565 for Rout from first level 305. Output color coordinate difference 555 is represented in graph 550 by the vertical separation between: i) the line between the x's that represent output color coordinates 570 and 575 and ii) the dot that represents output color coordinate 565. Output color coordinate 560 is interpolated from output color coordinates 570 and 575 for Rout from pixels 345*c* and 345*d*, respectively. FIG. 5 depicts another example output color coordinate difference 580 between output color coordinates 582 for Rout from zero level 300 and output color coordinates 585 for Rout from first level 305. Output color coordinate difference 580 is represented in graph 550 by the vertical separation between: i) the line between the x's that represent output color coordinates 590 and 595 and ii) the dot that represents output color coordinate 585. Output color coordinate 582 is interpolated from output colors coordinates 590 and 595 for Rout from pixels 345*e* and 345*f*, respectively. Output color coordinate differences 555 and 580 are specific examples of output color coordinate differences between zero level 300 and first level 305. Output color coordinate differences between zero level 300 and first level 305 are generally more extensive. Regions 597*a*, 597*b*, and 597*c* indicate more extensively where differences may exist between output color coordinates from zero level 300 and first level 305. The example output color coordinate differences 555 and 580 are substantially in the middle of regions 597*a* and 597*c*, respectively.

According to an example embodiment, lookup table generator 185 (e.g., applying smoothing filer 190) lowers the output color coordinates for pixels 345*c* and 345*d* and raises the output color coordinates for pixels 345*e* and 345*f* to decrease output color coordinate differences in regions 597*a*, 597*b*, and 597*c*. An amount that the output color coordinates for pixels 345*c* and 345*d* are lowered, and an amount that the output color coordinates for pixels 345*e* and 345*f* are raised, may be interdependent based on smoothing filter 190. The above description describes adjustments to the output color coordinates of pixels 345*c*, 345*d*, 345*e*, and 345*f* in row 350*a* for each upsampled slice 315*a*-315*d*. According to one embodiment, the adjustment described above is copied to each of the remaining rows 350*b*-350*d* for each upsampled slice 315*a*-315*d*. While the example embodiment is described as lowering the output color coordinates for pixels 345*c* and 345*d* and raising the output color coordinates for pixels 345*e* and 345*f*, the output color coordinates for 345*c* through 345*f* may be raised and/or lowered in other combination to reduce color aliasing generated by GPU 145.

The above description describes raising and lowering (i.e., adjusting) the output color coordinates for Rout for pixels 345*c*, 345*d*, 345*e*, and 345*g*. According to one embodiment, the adjustment described above is applied to raising and/or lowering (i.e., adjusting) the output color coordinates for Gout for pixels 345*c*, 345*d*, 345*e*, and 345*g*.

The foregoing describes the generation of mip map 180 and the adjustment of the output color coordinates of pixels 345 of zero level 300. Subsequent to generating mip map 180 and adjusting the output color coordinates of pixels 345 of zero level 300, zero level 300 and first level 305 of mip map 180 are transferred to GPU 145. FIG. 4 depicts zero level 300 and first level 305 being transferred to GPU 145, where GPU 145 uses mip map 180 to perform input color coordinate lookups in mip map 180 for pixels of input images 170. Based on the input color coordinate lookups in mip map 180, GPU 145 is configured to provide output color coordinates for output color components for output images 175.

According to one embodiment, prior to GPU 145 performing input color coordinate lookups in mip map 180 for generating output color coordinates for output color components for output images 175, the input color coordinates of the pixels of input images 170 are scaled. For example, the input color coordinates from Rin, which may have a range from 0 to 255, may be scaled to Sin, which may have a range smaller than 0 to 255. Further, the input color coordinates from Gin, which may have a range from 0 to 255, may be scaled to Tin, which may have a range smaller than 0 to 255. Tin represents the scaled input color coordinate for the input color coordinate for Gin. Scaling for the input color coordinate for Bin (blue in) is described separately below. It is briefly noted that the scaled input color coordinate for Bin is referred to herein as LOD.

According to one embodiment, computing device 110 includes a scaling module 390 that scales the input color coordinates Rin and Gin to generate the scaled input color coordinates Sin and Tin, respectively. While the input color coordinates are described above as being for input color components for R,G,B, according to other embodiments, the input color coordinates may be for input color components for C,M,Y (cyan, magenta, yellow), H,S,L (hue, saturation, lightness), H,S,V (hue, saturation, and value), or the like. The following description describes a method for scaling the input color coordinates for input color components for R,G,B according to one embodiment. However, according to other embodiments, the described scaling may be applied to other input color coordinates for other input color components, such as C,M,Y; H,S,L; H,S,V; etc.

According to one specific embodiment, Sin and Tin are scaled from Rin and Gin as follows:

Sin=scale factor in Sin*Rin+half pixel width+slice offset, and

Tin=scale factor in Tin*Gin+half pixel height, where scale factor in Sin=(LUT size−1)*pixel width;

scale facto in Tin=(LUT size−1)*pixel height;

pixel width=1.0/(LUT size*LUT size);

pixel height=1.0/LUT size;

half pixel width=pixel width/2.0; and half pixel height=pixel height/2.0.

The size of a LUT (or LUT size) is described above in detail.

The scaling of the input color coordinate Bin is presently described. According to one embodiment, the scaled input color coordinate LOD for the input color coordinate Bin is: LOD=Bin*modulo (1/(number of slices 310 in first level 305)).

According to one embodiment, Sin, Tin, LOD are generated for each input color coordinate for each pixel of input images 170 by scaling module 390. Subsequent to scaling, scaling module 390 transfers (see FIG. 4) the scaled input color coordinates Sin, Tin, LOD to GPU 145 for color correction by GPU 145 using mip map 180.

The ranges of Sin and Tin are presently described in further detail. Reference is again made to graph 550 in FIG. 5. As briefly described above, the vertical axis of graph 550 represents the output color coordinates for Rout generated by GPU 145 for level zero 300 and first level 305. GPU 145 may clamp (i.e., hold constant) the output color coordinates for Rout for two ranges of scaled input color coordinates Sin. GPU 145 may clamp the output color coordinates for Rout for Sin that is in a range 610. GPU 145 may also clamp the output color coordinates for Rout for Sin that is in a range 620. Graph 550 shows the output color coordinates for Rout clamped to 0.05, for example, for Sin that is in range 610, and shows the output color coordinates for Rout clamped to 0.95, for example, for Sin that is in range 620. It will be understood that graph 550 represents an example embodiment, and that the specific output color coordinates for Rout that are clamped to 0.05 and 0.95 and are not limiting on the claims.

According to the embodiment being described, range 610 corresponds to Sin extending from 0.0 to up a value at the middle of pixel 325a and range 620 corresponds to Sin extending from a value at the middle of the last half of pixel 325h to 1.0. According to one embodiment, the range of Sin does not include the ranges 610 and 620, but includes a range 630 that is between rages 610 and 620. That is, the range of Sin extends from the middle of pixel 325a to the middle of pixel 325h. According to one embodiment, the scaling: Sin=scale factor in Sin*Rin+half pixel width+slice offset, described above, scales Sin to the range 630.

According to one embodiment, Tin is scaled from the input color coordinate Gin for the second input color component (e.g., green), so that the output color coordinate for Gout is not clamped by GPU 145 for various ranges of Tin. According to one embodiment, the scaling: Tin=scale factor in Tin*Gin+half pixel height, described above, scales Tin so that the output color coordinate for Gout is not clamped by GPU 145 for various ranges of Tin.

Figure 6:
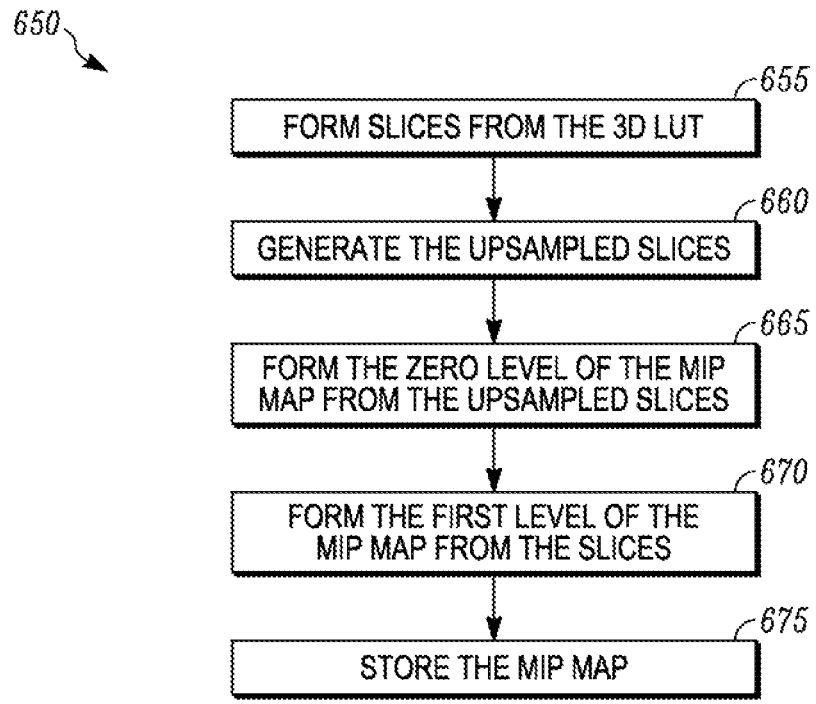
FIG. 6 depicts a high-level flow diagram for generating the mip map from the 3D LUT according to one embodiment.

FIG. 6 depicts a high-level flow diagram of a method 650 for generating mip map 180 from 3D LUT 200 according to one embodiment. The high-level flow diagram represents an example embodiment and those of skill in the art will understand that various steps of the high-level flow diagram may be combined and/or added without deviating from the scope and the purview of the embodiment.

At 655, N slices 310 (e.g., 2D slices 310) are formed from 3D LUT 200. N is the LUT size of 3D LUT 200. 3D LUT slicer 400 forms slices 310. N slices 310 are arranged in order from first slice 310a to last slice 310d (Nth slice).

At 660, N upsampled slices 315 are generated by upsampling slices 310. Resampling module 410 upsamples N slices 310 to generate upsampled slices 315. N upsampled slices 315 corresponding to N slices 310. N upsampled slices 315 are arranged in order from first upsampled slice 315a to last upsampled slice 315d (Nth upsampled slice).

At 665, zero level 300 (sometimes referred to as a first group of slices) is formed from N upsampled slices 315. Zero level 300 is formed by level generator 405.

At 670, first level 305 (sometimes referred to as a second group of slices) is formed from N slices 310. First level 305 is formed by level generator 405. First level includes second slice 310b through last slice 310d, with last slice 310d copied. Zero level 300 and first level 305 form the levels of mip map 180.

At 675, mip map 180 is stored in a storage, such as storage devices 115, 130, or 150. Thereafter, mip map 180 is provided to GPU 145.

Figure 7:
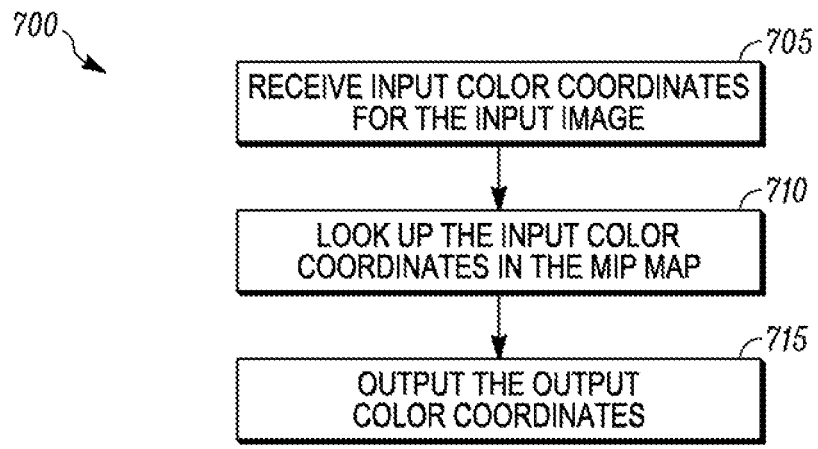
FIG. 7 depicts a high-level flow diagram for changing colors of pixels of an input image according to one embodiment.

FIG. 7 depicts a high-level flow diagram of a method 700 for changing colors of pixels of input image 170 according to one embodiment. The high-level flow diagram represents an example embodiment and those of skill in the art will understand that various steps of the high-level flow diagram may be combined and/or added without deviating from the scope and the purview of the embodiment.

At 705, GPU 145 receives input color coordinates for input colors of pixels included in input image 170. The input color coordinates may be Rin, Gin, Bin color coordinates, Sin, Tin, LOD color coordinates, or the like.

At 710, GPU 145 performs color coordinate lookups in mip map 180 for the input color coordinates received at 705.

At 715, GPU 145 outputs output color coordinates for changed colors for the pixels of input image 170 based on the color coordinate lookups at 710.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments, along with examples of how aspects thereof may be implemented. The above examples and embodiments should not be deemed to be the only embodiments, and are presented to illustrate the flexibility and advantages of the teachings hereof. Based on the above disclosure and the following claims, other arrangements, embodiments, implementations, and equivalents may be employed without departing from the scope hereof, as defined by the claims.

I claim:

1. A method for providing a lookup table (LUT) for changing color components of pixels of an image, the method comprising:
generating, via a computing device, an integer number, the integer number greater than or equal to one, of two-dimensional slices from a three-dimensional LUT, wherein the integer number of two-dimensional slices are arranged in order from a first two-dimensional slice to a last-numbered two-dimensional slice of the integer number of two-dimensional slices;
generating, via the computing device, another integer number, the other integer number greater or equal to one, of upsampled slices corresponding to the integer number of two-dimensional slices, wherein the other integer number of upsampled slices are arranged in order from a first upsampled slice to a last-numbered upsampled slice of the other integer number of upsampled slices;
forming, via the computing device, a first group of slices comprising the other integer number of upsampled slices;
forming, via the computing device, a second group of slices comprising a second two-dimensional slice of the integer number of two-dimensional slices through the last-numbered two-dimensional slice and a copy of the last-numbered two-dimensional slice; and
storing, via the computing device, the first group of slices and the second group of slices, respectively, in a zero level of a mip map and a first level of the mip map.

2. The method of claim 1, wherein the first upsampled slice through the last-numbered upsampled slice correspond respectively to the first two-dimensional slice through the last-numbered two-dimensional slice.

3. The method of claim 1, wherein the copy of the last-numbered two-dimensional slice is at an end of the second group of slices.

4. The method of claim 1, wherein a size of the second group of slices is half a size of the first group of slices.

5. The method of claim 1, wherein the first group of slices has a full scale for one color component, and the second group of slices has a portion of the full scale for the one color component.

6. The method of claim 1, further comprising transferring the mip map to a graphical processing unit (GPU), wherein the GPU is configured to perform color changes for received colors components of the pixels via color-coordinate lookups in the first and the second group of slices to generate changed color components for the pixels.

7. The method of claim 1, further comprising applying a smoothing filter to color components of the upsampled slices to decrease differences between color components from color-coordinate lookups in the first group of slices and the second group of slices.

8. The method of claim 1, wherein each of the integer number of two-dimensional slices includes a two-dimensional array of pixels having a first axis for a first color and a second axis for a second color component.

9. A method for changing colors of pixels of an image, the method comprising:
receiving, via a computing device, input color coordinates for input colors of the pixels, wherein the input color coordinates are for a first color component, a second color component, and a third color component;
performing, via a graphical processing unit (GPU) of the computing device, color coordinate lookups for the input color coordinates in a lookup table that is included in the GPU, wherein the lookup table includes:
a first group of slices comprising an integer number, the integer number greater than or equal to one, of upsampled slices arranged in order from a first upsampled slice to a last-numbered upsampled slice of the upsampled slices, wherein
the integer number of upsampled slices correspond to another integer number, the other integer number greater or equal to one, of two-dimensional slices generated from a three-dimensional LUT, and
the other integer number of two-dimensional slices are arranged in order from a first two-dimensional slice to a last-numbered two-dimensional slice of the other integer number of two-dimensional slices, and
a second group of slices comprising a second two-dimensional slice of the other integer number of two-dimensional slices through the last-numbered two-dimensional slice, and a copy of the last-numbered two-dimensional slice; and
outputting, from the GPU changed color components for the pixels based on the color coordinate lookups in the lookup table.

10. The method of claim 9, wherein the first upsampled slice through the last-numbered upsampled slice in the first group of slices correspond respectively to a second two-dimensional slice through the copy of the last-numbered two-dimensional slice in the second group of slices.

11. The method of claim 9, wherein the copy of the last-numbered two-dimensional slice is at an end of the second group of slices.

12. The method of claim 9, wherein a size of the second group of slices is half a size of the first group of slices.

13. The method of claim 9, further comprising:
scaling, via the computing device, a first input color coordinate of the input color coordinates for the first color component to eliminate color clamping by the GPU for the first color component; and
scaling, via the computing device, a second input color coordinate of the input color coordinates for the second color component to eliminate color clamping by the GPU for the second color component.

14. The method of claim 9, wherein the first group of upsampled slices and the second group of slices are stored in the GPU as a zero level slice and a first level slice, respectively, of a mip map.

15. A non-transitory computer-readable storage medium comprising instructions for providing a lookup table (LUT) for changing color components of pixels of an image, wherein the instructions, when executed, are for controlling a computing device to be configured for:
generating an integer number, the integer number greater or equal to one, of two-dimensional slices from a three-dimensional LUT, wherein the integer number of two-dimensional slices are arranged in order from a first two-dimensional slice to a last-numbered two-dimensional slice of the integer number of two-dimensional slices;
generating another integer number, the other integer number greater or equal to one, of upsampled slices corresponding to the integer number of two-dimensional slices, wherein the other integer number of upsampled slices are arranged in order from a first upsampled slice to a last-numbered upsampled slice of the other integer number of upsampled slices;
forming a first group of slices comprising the other integer number of upsampled slices;

forming a second group of slices comprising a second two-dimensional slice of the integer number of two-dimensional slices through the last-numbered two-dimensional slice and a copy of the last-numbered two-dimensional slice; and storing the first group of slices and the second group of slices, respectively, in a zero level of a mip map and a first level of the mip map.

16. The non-transitory computer-readable storage medium of claim 15, wherein the first upsampled slice through the last-numbered upsampled slice correspond respectively to the first two-dimensional slice through the last-numbered two-dimensional slice.

17. The non-transitory computer-readable storage medium of claim 15, wherein a size of the second group of slices is half a size of the first group of slices.

18. The non-transitory computer-readable storage medium of claim 15, wherein the first group of slices has a full scale for one color component, and the second group of slices has a portion of the full scale for the one color component.

19. A non-transitory computer-readable storage medium comprising instructions for changing color components of pixels of an image, wherein the instructions, when executed, are for controlling a computing device to be configured for:

receiving input color coordinates for input color components of the pixels, wherein the input color coordinates are for a first color component, a second color component, and a third color component;

performing color coordinate lookups for the input color coordinates in a lookup table that is included in a graphical processing unit (GPU), wherein the lookup table includes:

a first group of slices comprising an integer number, the integer number greater or equal to one, of upsampled slices arranged in order from a first upsampled slice to a last-numbered upsampled slice of the integer number of upsampled slices, wherein the integer number of upsampled slices correspond to another integer number, the other integer number greater or equal to one, of two-dimensional slices generated from a three-dimensional LUT, and the other integer number of two-dimensional slices are arranged in order from a first two-dimensional slice to a last-numbered two-dimensional slice of the other integer number of two-dimensional slices, and a second group of slices comprising a second two-dimensional slice of the other integer number of two-dimensional slices through the last-numbered two-dimensional slice, and a copy of the last-numbered two-dimensional slice; and outputting from the GPU changed color components for the pixels based on the color coordinate lookups in the lookup table.

20. The non-transitory computer-readable storage medium of claim 19, wherein the instructions, when executed, are for further controlling the computing device to be configured for:

scaling a first input color coordinate of the input color coordinates for the first color component to eliminate color clamping by the GPU for the first color component; and scaling a second input color coordinate of the input color coordinates for the second color component to eliminate color clamping by the GPU for the second color component.

* * * * *